United States Patent
Goel et al.

(10) Patent No.: US 8,102,569 B1
(45) Date of Patent: Jan. 24, 2012

(54) CONVERSION TO ALTERNATIVE COLOR SPACE USING A CACHE

(75) Inventors: Vaibhav Goel, Delhi (IN); Deepak Gilani, Gujranwala Town Part I Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 986 days.

(21) Appl. No.: 11/557,897

(22) Filed: Nov. 8, 2006

(51) Int. Cl.
 *H04N 1/40* (2006.01)

(52) U.S. Cl. .......................................... 358/2.1; 358/504

(58) Field of Classification Search .................... 358/1.9, 358/2.1, 500–501, 504, 527, 518–523; 382/162–167
See application file for complete search history.

(56) References Cited

U.S. PATENT DOCUMENTS

| | | | | |
|---|---|---|---|---|
| 5,666,436 A | * | 9/1997 | Eames | 382/167 |
| 5,870,077 A | * | 2/1999 | Dillinger et al. | 345/600 |
| 5,963,201 A | * | 10/1999 | McGreggor et al. | 345/549 |
| 6,173,072 B1 | * | 1/2001 | Linder | 382/162 |
| 6,681,041 B1 | * | 1/2004 | Stokes et al. | 382/164 |
| 6,728,398 B1 | * | 4/2004 | Hondl | 382/162 |
| 2002/0044293 A1 | * | 4/2002 | Fukasawa | 358/1.9 |
| 2002/0080380 A1 | * | 6/2002 | Sugiura et al. | 358/1.13 |
| 2004/0246506 A1 | * | 12/2004 | Hoshuyama et al. | 358/1.1 |
| 2004/0246526 A1 | * | 12/2004 | Ishigami et al. | 358/3.01 |
| 2006/0146196 A1 | * | 7/2006 | Suenaga et al. | 348/624 |
| 2006/0268298 A1 | * | 11/2006 | Wali et al. | 358/1.9 |

* cited by examiner

*Primary Examiner* — Thomas D Lee
*Assistant Examiner* — Stephen M Brinich
(74) *Attorney, Agent, or Firm* — Fish & Richardson P.C.

(57) ABSTRACT

A conversion cache can be used to perform a color conversion by selecting a pixel included in an image, wherein a source color space value is associated with the pixel; locating the source color space value in a conversion cache, wherein the conversion cache is generated in response to transforming the image to an alternative color space; retrieving an alternative color space value corresponding to the source color space value from the conversion cache; and generating a transformed pixel associated with the alternative color space value. Further, it can be determined that a second source color space value associated with a second pixel of the image is not in the conversion cache; the second source color space value can be transformed into a second alternative color space value; and the second source color space value and the corresponding second alternative color space value can be stored in the conversion cache.

14 Claims, 5 Drawing Sheets

| | | DeviceN | | | | | | | | |
|---|---|---|---|---|---|---|---|---|---|---|
| C | M | Y | K | Red | Grn | C | M | Y | K | |
| 0.0 | 0.0 | 0.0 | 0.0 | 1.0 | 0.0 | 0.0 | 1.0 | 1.0 | 0.0 | 315 |
| 0.0 | 0.0 | 0.0 | 0.0 | 0.5 | 0.75 | 0.33 | 0.0 | 1.0 | 0.25 | 320 |
| ⋮ | | | | | | | | | | |
| 0.0 | 0.0 | 0.0 | 0.0 | 0.25 | 0.5 | 0.5 | 0.0 | 1.0 | 0.5 | 325 |

FIG. 3

CONVERSION TO ALTERNATIVE COLOR SPACE USING A CACHE

BACKGROUND

The present disclosure relates to computer-based color conversion for transforming an image from one color space representation to another, for example, transforming an image represented using a DeviceN color space or a separation color space to an alternative color space representation.

An image can be comprised of a plurality of individual picture elements, or pixels, arranged to convey a specific visual impression, such as the recreation of an object or a person. Further, all of the pixels included in an image can be associated with a particular palette, such as a palette comprised of gray-scale values (also referred to as "black and white") and/or color values. Additionally, a pixel can be assigned a single value from the palette, such that the pixel represents a uniform color or shade within the image. In a gray-scale image, each pixel is assigned a value that corresponds to a shade falling within the range of black to white. Similarly, the values that can be assigned to the pixels of a color image are defined in accordance with the color model that is used.

A color model is a mathematical key that defines a specific color using a particular tuple of numbers. A three-tuple of numbers uses three separate color components to define the colors available in that color model. Each of the numbers comprising the three-tuple corresponds to a different color component. For example, a standard color model for the specification of a set of three colors is expressed using red, green, and blue (RGB). The RGB color model is commonly employed in connection with visual displays. The value of each color component in the RGB color model can range between 0 and 255, and can be expressed as an eight-bit binary number. Thus, the RGB color model provides for 16,777,216 unique colors. For example, the color blue can defined by the values red=0, green=0, blue=255. A variation of the color blue, however, can be defined by the values red=1, green=0, blue=255.

Similarly, in a four-tuple color model, each number comprising the four-tuple provides the value of a separate color component. One common four-tuple color model includes the color components cyan, magenta, yellow, and black (CMYK). In one implementation, the CMYK color model is used to describe the different inks needed to generate a given color when light is reflected from a white substrate, such as paper, on which the inks have been applied. Therefore, the CMYK color model is often referenced in association with printing applications. The CMYK color model also can be expanded through the addition of one or more other color components (or "spot colors") to permit the definition of custom colors.

As described above with respect to RGB, a color model also can be associated with a precise definition of how the color components are to be interpreted. The definition can be applied to any valid tuple to derive the corresponding color in that color model, such as a particular shade of blue. In forming the definition, each valid tuple that can be used to define a unique color in the color model is mapped to a set of available colors. The set of available colors can be selected such that there are at least as many discrete colors as the number of unique tuples that can be expressed using the color model. Thus, every unique value that can be represented using the tuples of the color model can correspond to a separate color or shade. The totality of colors or shades that can be represented using the unique values of a particular color model is referred to as the gamut of that color model. As the number of unique tuples that can be expressed using the color model increases, the range and/or depth of the color space also can be increased.

Additionally, a color conversion can be performed to transform an image from one color space representation to another. For example, an image can be stored in an electronic file using the hue, saturation, value (HSV) color space. An associated display device, however, can be configured to support only the RGB color space. Thus, in order to present the image on the associated display device, the image can be converted from the HSV color space to the RGB color space. Similarly, an associated printer can be configured to support only the CMYK color model. Therefore, the image can be transformed into a CMYK representation prior to printing.

The source color space of the image and the destination color space of the transformed image can include one or more common colors. If the gamut of the source color space differs from the gamut of the destination color space, however, a mismatch can result for one or more pixels. Thus, during a color conversion, a best match is sought between the two color spaces. With some conversion techniques it is possible to preserve all of the color information as defined in the original image. These conversion techniques are therefore reversible. A portion of the color information associated with the original image is destroyed with other conversion techniques, however, and these techniques cannot be reversed.

A color conversion between color space representations can be performed mathematically. In performing the conversion, a pixel included in the image is selected and the value associated with that pixel is transformed from the source color space to the destination color space. For example, an algorithm comprising one or more equations can be used to map a color value expressed in the RGB color space to an equivalent CMYK color value. The numbers comprising the RGB-tuple can be entered into the equation and the resulting CMYK color value can be generated. The same algorithm can be used to transform the value associated with each pixel of the original image.

Performing one or more computations for each pixel of an image can result in a lengthy process. Thus, conversion tables have been generated in an attempt to decrease the time required to execute a color conversion. A conversion table maps the values of a source color space to equivalent or comparable values of at least one destination color space. Thus, during a color conversion, the tuple associated with a pixel of the image being transformed can be located in the conversion table and the transformed value can be identified without the need to solve one or more equations. Depending on the color model, however, a conversion table can be very large. For example, a conversion table for transforming an image represented using an RGB color model can have over 16.7 million entries. Further, it can be necessary to generate a plurality of conversion tables to account for the plurality of possible destination color spaces into which an image can be transformed.

SUMMARY

The present inventors recognized the need to provide an improved system and method for performing a color conversion to transform an image from one color space representation to another. The need also was recognized to store one or more pixel values associated with a source color space and corresponding pixel values associated with a destination color space in a conversion cache. Further, the need was recognized to utilize the conversion cache during the color conversion to determine the destination color space value corresponding to a source color space value. Additionally, the present inventors recognized the need to store in the conversion cache only pixel values associated with the original image and the corresponding transformed pixel values.

The present inventors also recognized the need to reuse the results of a transformation computation for subsequent pixels having identical values. Further, the present inventors recognized the need to permit limiting the size of a conversion cache, such as to a particular amount of memory or a predetermined number of entries. Additionally, the need was recognized to generate a conversion cache upon the opening or viewing of an image defined using a color space that is not supported by at least one associated output device.

Further, the present inventors recognized the need to permit performing a color conversion using a conversion cache when an output device does not support at least one color component associated with an original image. Additionally, the need was recognized to permit prioritizing one or more image attributes with respect to a particular color conversion.

In general, in one aspect, the techniques can be implemented to include selecting a pixel included in an image, wherein a source color space value is associated with the pixel; locating the source color space value associated with the pixel in a conversion cache, wherein the conversion cache is generated in response to transforming the image to an alternative color space; retrieving from the conversion cache an alternative color space value corresponding to the source color space value; and generating a transformed pixel associated with the alternative color space value.

The techniques also can be implemented to include determining that a second source color space value associated with a second pixel included in the image is not present in the conversion cache; transforming the second source color space value into a second alternative color space value; and storing the second source color space value and the corresponding second alternative color space value in the conversion cache. The techniques further can be implemented to include providing the second source color space value as input to a conversion algorithm and receiving the second alternative color space value as an output from the conversion algorithm. Additionally, the techniques can be implemented such that the conversion cache comprises a size-limited conversion cache. Further, the techniques can be implemented to include deleting at least one entry from the conversion cache and generating a new entry in the conversion cache comprising the second source color space value and the second corresponding alternative color space value.

The techniques also can be implemented such that the image includes an indicator identifying the alternative color space. Further, the techniques can be implemented to include determining that a source color space associated with the image is not supported by an output device and initiating a color conversion to transform the image to an alternative color space. Additionally, the techniques can be implemented to include determining that the output device supports the alternative color space prior to initiating the color conversion.

In general, in another aspect, the techniques can be implemented as a computer program product, encoded on a computer-readable medium, operable to cause data processing apparatus to perform operations comprising selecting a pixel included in an image, wherein a source color space value is associated with the pixel; locating the source color space value associated with the pixel in a conversion cache, wherein the conversion cache is generated in response to transforming the image to an alternative color space; retrieving from the conversion cache an alternative color space value corresponding to the source color space value; and generating a transformed pixel associated with the alternative color space value.

The techniques also can be implemented to be further operable to cause data processing apparatus to perform operations comprising determining that a second source color space value associated with a second pixel included in the image is not present in the conversion cache; transforming the second source color space value into a second alternative color space value; and storing the second source color space value and the corresponding second alternative color space value in the conversion cache. Additionally, the techniques can be implemented to be further operable to cause data processing apparatus to perform operations comprising providing the second source color space value as input to a conversion algorithm and receiving the second alternative color space value as an output from the conversion algorithm. Further, the techniques can be implemented such that the conversion cache comprises a size-limited conversion cache.

The techniques also can be implemented to be further operable to cause data processing apparatus to perform operations comprising deleting at least one entry from the conversion cache and generating a new entry in the conversion cache comprising the second source color space value and the second corresponding alternative color space value. Further, the techniques can be implemented such that the image includes an indicator identifying the alternative color space.

The techniques also can be implemented to be further operable to cause data processing apparatus to perform operations comprising determining that a source color space associated with the image is not supported by an output device and initiating a color conversion to transform the image to an alternative color space. Additionally, the techniques can be implemented to be further operable to cause data processing apparatus to perform operations comprising determining that the output device supports the alternative color space prior to initiating the color conversion.

In general, in another aspect, the techniques can be implemented as a system comprising an image; a memory configured to store a conversion cache; an output device; and processor electronics configured to perform operations comprising selecting a pixel included in the image, wherein a source color space value is associated with the pixel; locating the source color space value associated with the pixel in the conversion cache, wherein the conversion cache is generated in response to transforming the image to an alternative color space; retrieving from the conversion cache an alternative color space value corresponding to the source color space value; and generating a transformed pixel associated with the alternative color space value.

The techniques also can be implemented such that the processor electronics are further configured to perform operations comprising determining that a second source color space value associated with a second pixel included in the image is not present in the conversion cache; transforming the second source color space value into a second alternative color space value; and storing the second source color space value and the corresponding second alternative color space value in the conversion cache. Additionally, the techniques can be implemented such that the processor electronics are further configured to perform operations comprising providing the second source color space value as input to a conversion algorithm and receiving the second alternative color space value as an output from the conversion algorithm.

The techniques also can be implemented such that the processor electronics are further configured to perform operations comprising determining that a source color space associated with the image is not supported by the output device and initiating a color conversion to transform the image to an alternative color space. Additionally, the techniques can be implemented such that the processor electronics are further configured to perform operations comprising determining that the output device supports the alternative color space prior to initiating the color conversion.

The techniques described in this document can be implemented to realize one or more of the following advantages. For example, the techniques can be implemented to decrease the time required to transform an image from one color space to another. The techniques also can be implemented to generate a conversion table that contains entries only for pixel values associated with the original and corresponding transformed pixel values. Additionally, the techniques can be implemented such that a transformation computation is performed only once for each unique pixel value associated with the original image.

The techniques also can be implemented to permit using any desired color conversion algorithm. Additionally, the techniques can be implemented such that the conversion cache contains a limited number of entries, such as the values associated with the most recently selected pixels. Further, the techniques can be implemented such that a color conversion is initiated upon the opening or viewing of an image represented using a color space that is not supported by at least one associated output device to reduce the delay experienced by the user when output of the image is requested.

These general and specific techniques can be implemented using an apparatus, a method, a computer program product, a system, or any combination of an apparatus, methods, computer program products, and systems. The details of one or more implementations are set forth in the accompanying drawings and the description below. Further features, aspects, and advantages will become apparent from the description, the drawings, and the claims.

BRIEF DESCRIPTION OF THE DRAWINGS

FIG. 3 presents an example of a conversion cache.

Like reference symbols indicate like elements throughout the specification and drawings.

DETAILED DESCRIPTION

Figure 1:
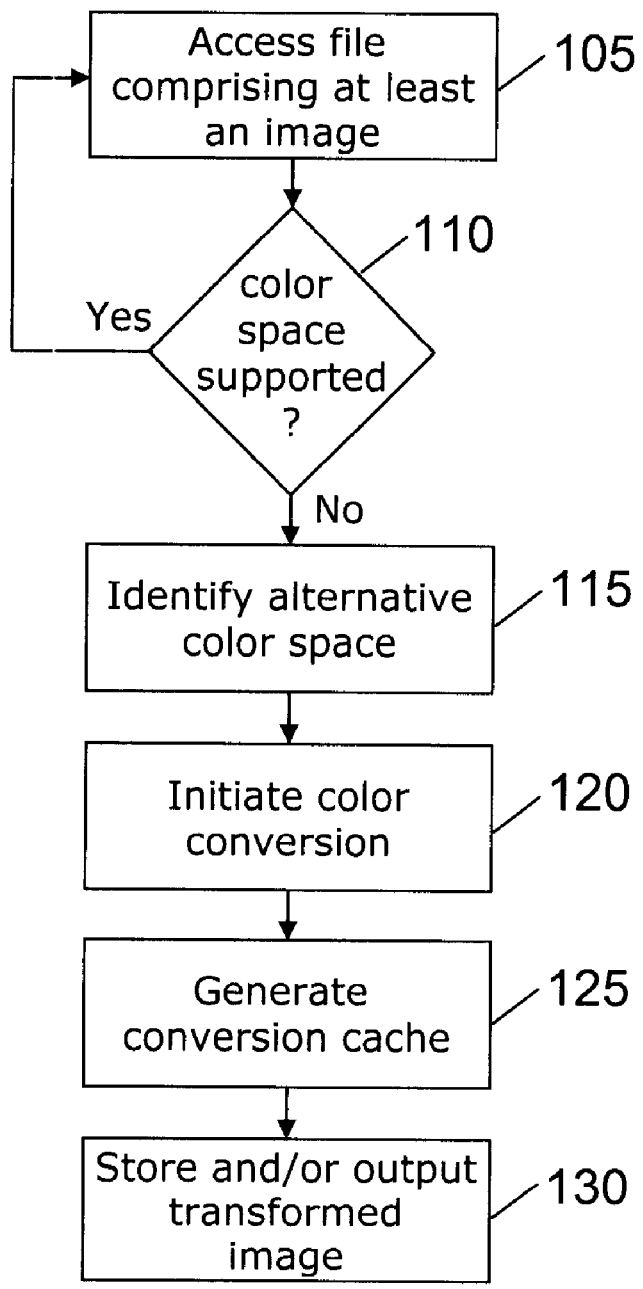
FIG. 1 presents a method of performing a color conversion using a conversion cache.

FIG. 1 presents a method of performing a color conversion to transform an image from one color space representation to another using a conversion cache. A file comprising at least one image can be accessed through an application, such as a reader or browser application (105). In another implementation, the image can be stored using a plurality of files, stored in a memory location, or represented in another form, such as streaming media.

Further, the image can be represented using a source color space. For example, the source color space can be a DeviceN color space, which can include CMYK values and values associated with up to 28 additional color components. In another implementation, the source color space can be any other color space known in the art, including a CIE color space, the HSV color space, the HSL color space, or a HiFi color system such as PANTONE® Hexachrome™. Additionally, the file can comprise a collection of data that includes the image. For example, the image can be embedded in a document comprising a plurality of content types, including text, graphics, images, audio, and/or video. Alternatively, the file can comprise an image file that contains the image.

Upon accessing the file, the application can be configured to determine whether the image, as well as any other images included in the file, have been represented using a color space that is not supported by at least one output device associated with the application, such as a printer or a display (110). For each such image, the application can identify a corresponding alternative color space (115). For example, the image can be associated with at least one alternative color space that can be used to represent the image when the source color space is not supported. In an implementation, an indicator identifying the alternative color space can be associated with the image. The alternative color space comprises the destination color space for a color conversion. Further, the alternative color space can be specified by an application or an individual, such as the user who generated the image. Additionally, the alternative color space can be selected such that it is commonly supported by one or more output device types.

Further, the application can be configured to automatically initiate a color conversion to transform the image from the source color space to the alternative color space (120). In an implementation, the color conversion can be initiated once the application has determined that the source color space of the image is not supported by at least one output device associated with the application. In another implementation, initiating the color conversion can be delayed until the application receives a command or other such request to output the image to an output device that does not support the source color space. Additionally, the application can be configured to verify that one or more of the associated output devices support the alternative color space prior to initiating the color conversion.

The color conversion also can be performed using an algorithm intended to prioritize one or more image properties. For example, the selected algorithm can preserve one or more image properties, such as brightness or contrast, at the expense of one or more other image properties. The color conversion algorithm can be selected based on user specifications, one or more properties associated with the image, one or more application settings, or any combination thereof.

The color conversion is performed by transforming each pixel of the image from the source color space to the alternative color space. The color conversion, however, does not alter the relationship of the pixels to one another. Therefore, the pixel occupying the position (x, y) in the image corresponds to the transformed pixel occupying the position (x, y) in the transformed image. Additionally, the source color space value of the pixel in the image corresponds to the alternative color space value of the transformed pixel occupying the same position in the transformed image. In another implementation, the resolution of the image can differ from the resolution of the transformed image. Therefore, a pixel in one image can correspond to two or more pixels in the other image. For example, the pixel occupying the position (x, y) in the image can correspond to a plurality of transformed pixels occupying a plurality of positions in the transformed image, such as (x, y) and (x+1, y).

Further, a conversion cache can be generated for use in performing the color conversion (125). During the color conversion, the first time a pixel value associated with the source color space is encountered the pixel value can be transformed to an alternative color space representation using a conversion algorithm. Additionally, the pixel value associated with the source color space and the transformed value corresponding to the alternative color space can be added to the conversion cache. Each time the source color space pixel value is subsequently encountered, the transformed pixel value can be identified in the conversion cache. Thus, each unique pixel value is transformed by the conversion algorithm only once. When the color conversion is complete, the transformed image, which is comprised of transformed pixels, can be stored and/or output to an output device (130).

Figure 2:
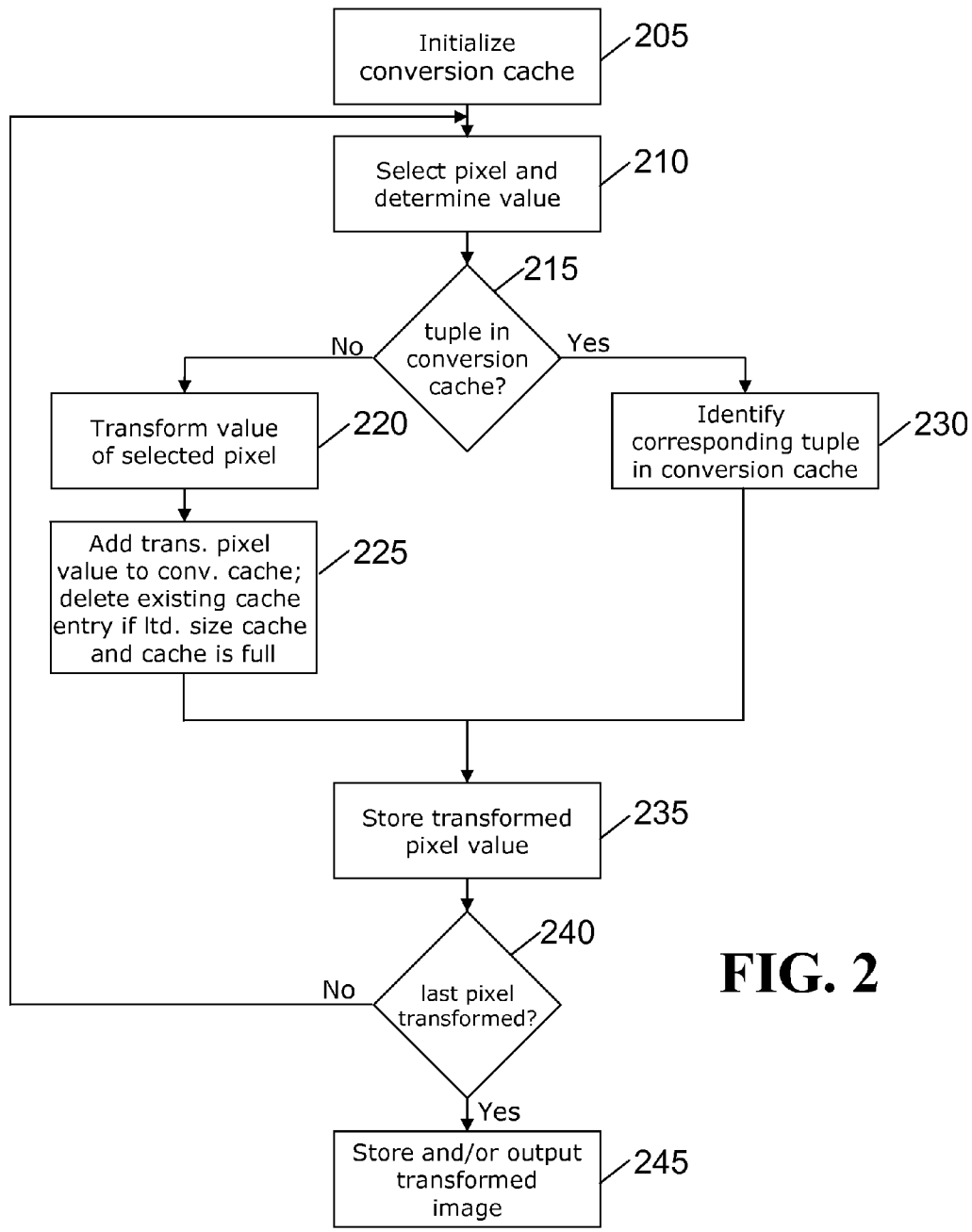
FIG. 2 describes a method of generating a conversion cache.

FIG. 2 describes a method of generating a conversion cache. A conversion cache can be initialized for a color conversion (205). In an implementation, the conversion cache can be structured as a table that includes two columns. The first column can be configured to store values representing valid tuples in the source color space of an image and the second column can be configured to store values representing valid tuples in the corresponding alternative color space. Thus, an entry (or row) in the conversion cache represents a unique pixel value included in the original image that is defined in the source color space and the corresponding transformed pixel value in the alternative color space.

A pixel associated with the image is selected and the value of the selected pixel with respect to the source color space can be determined (210). For example, a selected pixel associated with the image can be defined by a tuple comprising M-values that corresponds to the DeviceN color space. If the DeviceN color space utilized to represent the original image comprises six color components, such as CMYK plus the spot color orange and the spot color green, the tuple corresponding to the selected pixel also will be comprised of six values.

The conversion cache can be searched to determine whether the tuple representing the selected pixel is included as an entry in the conversion cache (215). If an entry matching the source color space value of the selected pixel is not found in the conversion cache, the value of the selected pixel can be transformed from the source color space using a color conversion algorithm to generate the N-values in the alternative color space that corresponds to the selected pixel (220). Further, an entry representing the selected pixel value can be added to the conversion cache (225). The entry can include the tuple comprising the M-values of the source color space and the corresponding tuple comprising the N-values of the alternative color space.

Alternatively, if an entry matching the source color space pixel value of the selected pixel is found in the conversion cache, the corresponding tuple representing the N-values of the alternative color space is identified (230). The transformed pixel value can be stored to construct the transformed image (235). Further, it can be determined whether the last pixel of the image has been transformed (240). If any pixels of the image have not been transformed, the next pixel can be selected (210). Otherwise, the transformed image can be stored and/or output to the output device (245).

In an implementation, the size of the conversion cache can be limited. For example, the conversion cache can be limited to a particular amount of memory or a specific number of entries. Further, a size-limited conversion cache can be structured as a first-in first-out (FIFO) cache. For example, in a conversion cache that is limited to a specific number of entries, the oldest entry in the conversion cache can be deleted when a new entry is added. Similarly, in a conversion cache that is limited to a particular amount of memory, the one or more oldest entries can be deleted when the maximum memory size has been reached and a new entry is added.

In another implementation, the size-limited conversion cache can be structured as a hash table. The hash table can be organized as an array of pointers, such as 1,024 or 2,048 pointers. Each pointer can be assigned a unique hash value and can indicate the beginning of a linked list. When the selected hashing function is applied to a valid source color space pixel value, one of the unique hash values is calculated. Thus, the set of valid source color space pixel values is mapped to the set of unique hash values in an m:n relationship. Further, the hashing function can be based on a deterministic algorithm.

Upon selecting a pixel, the hash value corresponding to the source color space value associated with that pixel can be calculated using the selected hashing function. The pointer corresponding to the calculated hash value then can be identified in the hash table and the linked list associated with the pointer can be searched. Each entry in the linked list can include a source color space value and a corresponding alternative color space value. If an entry that includes the source color space pixel value associated with the selected pixel is found, the corresponding alternative color space value is retrieved. Otherwise, the alternative color space value can be calculated, and a new entry including the source color space value of the selected pixel and the corresponding alternative color space value can be added to the linked list associated with the identified pointer. Further, the size of the conversion cache can be limited by restricting the number of entries that can be contained in a linked list or the total number of entries in the hash table. Once the maximum size has been reached, an existing entry can be deleted when a new entry is added.

FIG. 3 presents an example of a conversion cache 300. The conversion cache 300 can include a source color space column 305, which has a subcolumn for each color component of the source color space. For example, the source color space of the conversion cache 300 is comprised of CMYK values, the spot color red, and the spot color green. Thus, the source color space column 305 includes six subcolumns. The conversion cache 300 also can include an alternative color space column 310, which has a subcolumn for each color component of the alternative color space. For example, the alternative color space of the conversion cache 300 is comprised of CMYK values.

Each row of the conversion cache 300 can be used to store an M-tuple associated with the source color space and an N-tuple associated with the alternative color space. When an M-tuple associated with the source color space is transformed, such as during the color conversion, the N-tuple generated by the transformation can be stored along with the M-tuple in the conversion cache 300. For example, the first row 315 of the conversion cache 300 identifies the values associated with a pixel of the image using an M-tuple representation. The first row 315 indicates that the color value of the spot color red is 1.0 and the values of cyan, magenta, yellow, black (key), and the spot color green are 0.0. Further, the first row 315 also indicates that the transformed values corresponding to the pixel comprise an N-tuple in which the value of magenta and yellow is 1.0 and the value of cyan and key is 0.0.

An additional row can be added to the conversion cache 300 each time a pixel value that has not already been stored in the conversion cache 300 is transformed. For example, source color space and alternative color space representations of a second pixel that differs from the first pixel can be stored in the second row 320 of the conversion cache 300. In an implementation, the values stored in the first row 315 of the conversion cache 300 represent the most recently transformed pixel. Further, if the conversion cache 300 is size-limited, at least the last row 325 of the conversion cache 300 can be deleted when new values associated with a pixel are inserted.

In another implementation, one or more other data items, such as access statistics, can be associated with a size-limited conversion cache and used to identify one or more rows to delete.

Figure 4:
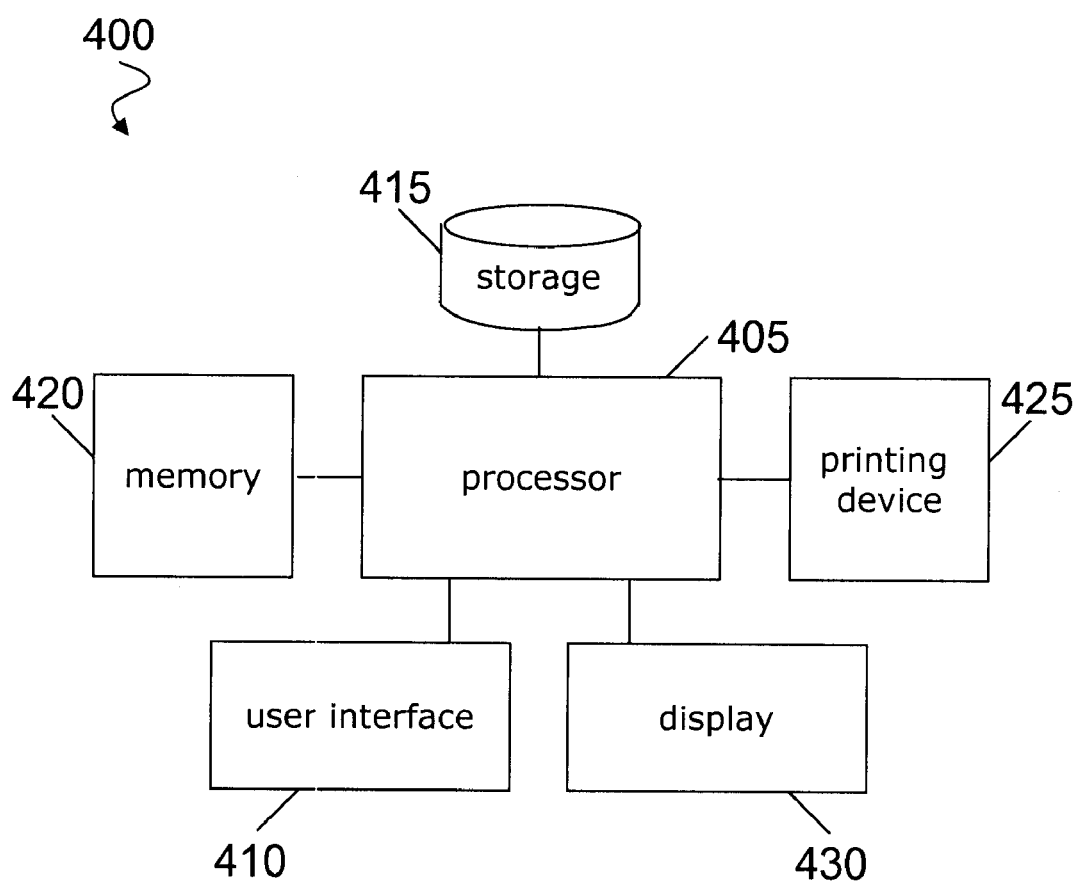
FIG. 4 presents a computer system for performing a color conversion using a conversion cache.

FIG. 4 presents a computer system 400 for performing a color conversion using a conversion cache. The computer system 400 includes a processor 405 that can be configured to execute one or more applications hosted on the computer system 400, such as a document reader or a web browser. The processor 405 also can be configured to receive input from a user through a user interface 410, including a keyboard, a mouse, a touch pad, a touch screen, a joystick, or any other user interface known in the art. Further, the processor 405 can access an electronic file stored on a storage device 415. The storage device 415 can be a disk drive, a flash drive, an optical drive, or other such non-volatile storage medium. In an implementation, the computer system 400 also can include a network connection and the processor 405 can be configured to access an electronic file across a computer network, such as a local area network or the Internet.

The processor 405 can determine whether the accessed electronic file includes an image that has been represented using a color space that is not supported by at least one output device associated with the computer system 400. For example, the processor 405 can be configured to detect that the color space used to represent an image included in an electronic document is not supported by a display 430 or a printing device 425.

Upon determining that the accessed electronic file includes an image represented using a color space that is not supported by at least one output device associated with the computer system 400, the processor 405 can initiate a color conversion. Further, the processor 405 can generate a conversion cache for use in performing the color conversion. The conversion cache can be stored in a memory 420 associated with the computer system 400, such as a random access memory or a virtual memory. Once generated, the conversion cache can be used to store source color space and corresponding alternative color space values associated with one or more pixels included in the image.

Figure 5:
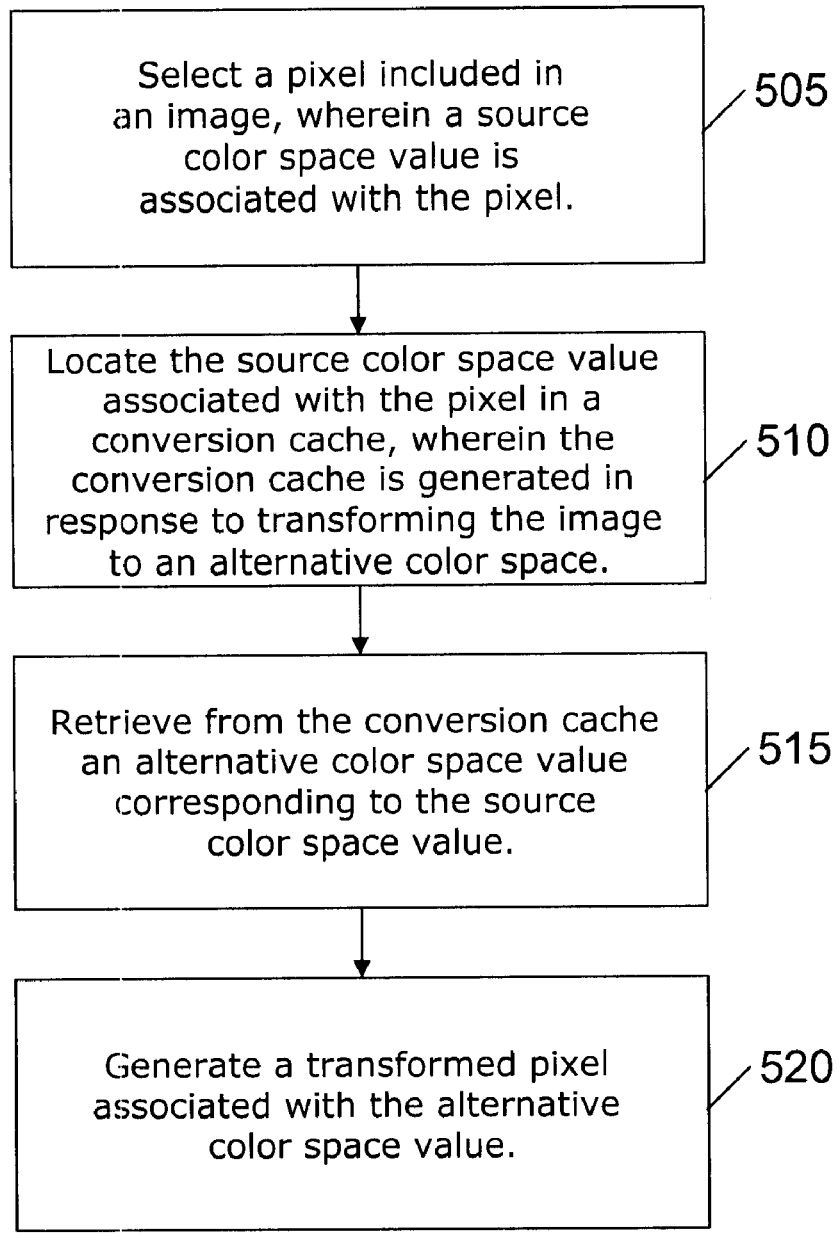
FIG. 5 presents a method of using a conversion cache.

FIG. 5 presents a method of using a conversion cache. A pixel included in an image is selected, wherein a source color space value is associated with the pixel (505). The source color space value associated with the pixel is located in a conversion cache, wherein the conversion cache is generated in response to transforming the image to an alternative color space (510). An alternative color space value corresponding to the source color space value is retrieved from the conversion cache (515). Once the alternative color space value is retrieved, a transformed pixel associated with the alternative color space value is generated (520).

The various aspects of the subject matter described in this specification and all of the functional operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer program products, i.e., one or more modules of computer program instructions encoded on a computer readable medium for execution by, or to control the operation of, data processing apparatus. The instructions can be organized into modules in different numbers and combinations from the exemplary modules described. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of two or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows also can be performed by, and apparatus also can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory, or both. The essential elements of a computer are a processor for performing instructions and one or more memory devices for storing instructions and data. Generally, a computer also will include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer-implemented method comprising:
   identifying a source color space used for an image;
   identifying an output device for generating a presentation of the image;
   determining that the output device does not support the source color space;
   selecting a pixel included in the image, wherein a source color space value is associated with the pixel;
   reading, in response to the determination, an indicator included in the image that identifies an alternative color space to use with the image that is supported by the output device;
   locating the source color space value associated with the pixel in a conversion cache, wherein the conversion cache is generated in response to transforming the image to the alternative color space identified by the indicator;
   retrieving from the conversion cache an alternative color space value corresponding to the source color space value; and
   generating a transformed pixel associated with the alternative color space value.

2. The method of claim 1, further comprising:
   determining that a second source color space value associated with a second pixel included in the image is not present in the conversion cache;
   transforming the second source color space value into a second alternative color space value; and
   storing the second source color space value and the corresponding second alternative color space value in the conversion cache.

3. The method of claim 2, wherein transforming the second source color space value further comprises:
   providing the second source color space value as input to a conversion algorithm; and
   receiving the second alternative color space value as an output from the conversion algorithm.

4. The method of claim 2, wherein the conversion cache comprises a size-limited conversion cache.

5. The method of claim 4, further comprising:
   deleting at least one entry from the conversion cache; and
   generating a new entry in the conversion cache comprising the second source color space value and the second corresponding alternative color space value.

6. A computer program product, encoded on a non-transitory computer-readable medium, operable to cause data processing apparatus to perform operations comprising:
   identifying a source color space used for an image;
   identifying an output device for generating a presentation of the image;
   determining that the output device does not support the source color space;
   selecting a pixel included in the image, wherein a source color space value is associated with the pixel;
   reading, in response to the determination, an indicator included in the image that identifies an alternative color space to use with the image that is supported by the output device;
   locating the source color space value associated with the pixel in a conversion cache, wherein the conversion cache is generated in response to transforming the image to the alternative color space identified by the indicator;
   retrieving from the conversion cache an alternative color space value corresponding to the source color space value; and
   generating a transformed pixel associated with the alternative color space value.

7. The computer program product of claim 6, further operable to cause data processing apparatus to perform operations comprising:

determining that a second source color space value associated with a second pixel included in the image is not present in the conversion cache;

transforming the second source color space value into a second alternative color space value; and storing the second source color space value and the corresponding second alternative color space value in the conversion cache.

8. The computer program product of claim 7, further operable to cause data processing apparatus to perform operations comprising:

providing the second source color space value as input to a conversion algorithm; and receiving the second alternative color space value as an output from the conversion algorithm.

9. The computer program product of claim 7, wherein the conversion cache comprises a size-limited conversion cache.

10. The computer program product of claim 9, further operable to cause data processing apparatus to perform operations comprising:

deleting at least one entry from the conversion cache; and generating a new entry in the conversion cache comprising the second source color space value and the second corresponding alternative color space value.

11. A system comprising:

an image;

a memory configured to store a conversion cache;

an output device; and processor electronics configured to perform operations comprising:

identifying a source color space used for the image;

determining that the output device does not support the source color space;

selecting a pixel included in the image, wherein a source color space value is associated with the pixel;

reading, in response to the determination, an indicator included in the image that identifies an alternative color space to use with the image that is supported by the output device;

locating the source color space value associated with the pixel in the conversion cache, wherein the conversion cache is generated in response to transforming the image to the alternative color space identified by the indicator;

retrieving from the conversion cache an alternative color space value corresponding to the source color space value; and generating a transformed pixel associated with the alternative color space value.

12. The system of claim 11, wherein the processor electronics are further configured to perform operations comprising:

determining that a second source color space value associated with a second pixel included in the image is not present in the conversion cache;

transforming the second source color space value into a second alternative color space value; and storing the second source color space value and the corresponding second alternative color space value in the conversion cache.

13. The system of claim 12, wherein the processor electronics are further configured to perform operations comprising:

providing the second source color space value as input to a conversion algorithm; and receiving the second alternative color space value as an output from the conversion algorithm.

14. The system of claim 11, further comprising:

a display; and wherein the processor electronics are further configured to perform operations comprising:

generating a transformed image comprising a plurality of transformed pixels; and outputting the transformed image to the display.

* * * * *